(12) United States Patent
Kamiyama

(10) Patent No.: US 6,392,966 B1
(45) Date of Patent: May 21, 2002

(54) FEED VELOCITY CONTROL APPARATUS FOR CONTROLLING THE MOVEMENT OF INFORMATION READING POINT OF DISC PLAYER

(75) Inventor: Hideyo Kamiyama, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/394,503

(22) Filed: Sep. 13, 1999

(30) Foreign Application Priority Data

Sep. 14, 1998 (JP) .......................................... 10-259738

(51) Int. Cl.$^7$ ................................................. G11B 7/00
(52) U.S. Cl. ..................................................... 369/44.28
(58) Field of Search ........................... 369/44.27, 44.28, 369/44.29, 53.42, 53.28, 53.29

(56) References Cited

U.S. PATENT DOCUMENTS 4,887,253 A  * 12/1989  Tateishi ................... 369/44.28
5,517,476 A    5/1996  Hayashi \* cited by examiner

*Primary Examiner*—Nabil Hindi
(74) *Attorney, Agent, or Firm*—Morgan, Lewis & Bockius LLP

(57) ABSTRACT

A feed velocity control apparatus of a disc player which can execute a stable velocity control of an information reading point by reducing influences by scratches formed on the recording surface of a recording disc, noises, or the like. A velocity signal corresponding to a transporting velocity of the information reading point at the present time point for the recording disc is obtained based on a tracking error signal. At the time of the track jumping operation, when the velocity signal lies within a predetermined velocity range, the information reading point is transferred in accordance with a velocity error signal corresponding to a difference between the velocity signal and a predetermined velocity. When the velocity signal is out of the predetermined velocity range, the information reading point is transferred in accordance with a low band component of the velocity error signal in place of the velocity error signal.

12 Claims, 9 Drawing Sheets

FEED VELOCITY CONTROL APPARATUS FOR CONTROLLING THE MOVEMENT OF INFORMATION READING POINT OF DISC PLAYER

BACKGROUND OF THE INVENTION

1. Field of the Invention

The invention relates to a feed velocity control apparatus for the velocity control of an information reading point for use in a disc player for reproducing recorded information from a recording disc.

2. Related Background Art

Various discs, such as CD, DVD, MD, MO, hard disk, or the like are put into practical use as optical, magnetooptic, or magnetic information recording discs (hereinafter, simply referred to as recording discs).

In a disc player for reproducing information data from the recording disc, a velocity servo operation is performed to control a feed velocity of a pickup in the disc's radial direction in order to move an information reading point of the pickup to a desired recording position (on the disc's recording surface) at a high speed. The velocity servo is a technique for controlling the feed velocity of the pickup so that a predetermined velocity of the information reading point is attained by using a tracking error signal that is obtained when the information reading point of the pickup traverses recording tracks formed on the recording surface of the recording disc.

More specifically, the first step is to binarize the tracking error signal which is obtained at the time of a track jump based on a predetermined threshold value. This generates a track crossing signal whose logical level changes in a way "1"→"0"→"1" (or "0"→"1"→"0") each time the information reading point transverses the recording tracks. The pulse width of the track crossing signal corresponds to a sum of velocities obtained by adding a transporting velocity of a slider at the present time point and a velocity at which the information reading point is moved by a tracking actuator. That is, the information reading point is moved at a low speed when the pulse width of the track crossing signal is long and transported at a high speed when the pulse width is short.

Therefore, by performing a velocity servo operation to the slider and the tracking actuator in such a manner as to decelerate them when the pulse width of the track crossing signal is short and accelerate them when it is long, the transporting velocity of the information reading point at the time of the track jump can be controlled so as to attain a predetermined velocity.

However, when an amplitude level of the tracking error signal decreases due to a scratch or the like formed on the disc recording surface, the track crossing signal drops for such a period of time. Consequently, the pulse width of the track crossing signal becomes long irrespective of the moving velocity of the information reading point at the present time point and the slider and the tracking actuator are excessively driven than they are needed in order to settle the velocity servo. Even if the pulse width of the track crossing signal is subsequently returned to the normal state, therefore, it is difficult to promptly settle the velocity servo system and a problem arises that the stable constant velocity control is not performed. An erroneous pulse train irrespective of the tracking error signal is multiplexed to the track crossing signal due to an influence of noises or the like, so that a similar problem occurs also in cases where the pulse width of the tracking error signal becomes unusually short.

OBJECT AND SUMMARY OF THE INVENTION

The invention has been made to solve the problems and it is an object to provide a feed velocity control apparatus for a velocity control of an information reading point in a disc player which can perform a stable velocity control by reducing influences of scratches formed on a recording surface of a recording disc, noises, or the like.

According to the invention, there is provided a feed velocity control apparatus for a velocity control of an information reading point of a disc player which comprises an information reading device for reading recording information from recording tracks formed on a recording disc thereby obtaining a read signal, and a moving device for moving the information reading point of the information reading means in the direction which transverses the recording tracks, the apparatus comprising: tracking error generating means for generating a tracking error signal based on the read signal; velocity signal generating means for generating a velocity signal corresponding to a transporting velocity of the transporting means on based on the tracking error signal; velocity error signal generating means for generating a velocity error signal corresponding to a difference between the velocity signal and a predetermined velocity at the time of a track jumping operation of the information reading means; a low pass filter for obtaining a velocity error low band signal by extracting a low band component of the velocity error signal; and constant velocity control means for driving the moving device in accordance with the velocity error signal when the velocity signal lies within a predetermined velocity range at the time of the track jumping operation of the information reading means and driving the moving device in accordance with the velocity error low band signal in place of the velocity error signal when the velocity signal is out of the predetermined velocity range.

DETAILED DESCRIPTION OF THE PREFERRED EMBODIMENT

Figure 1:
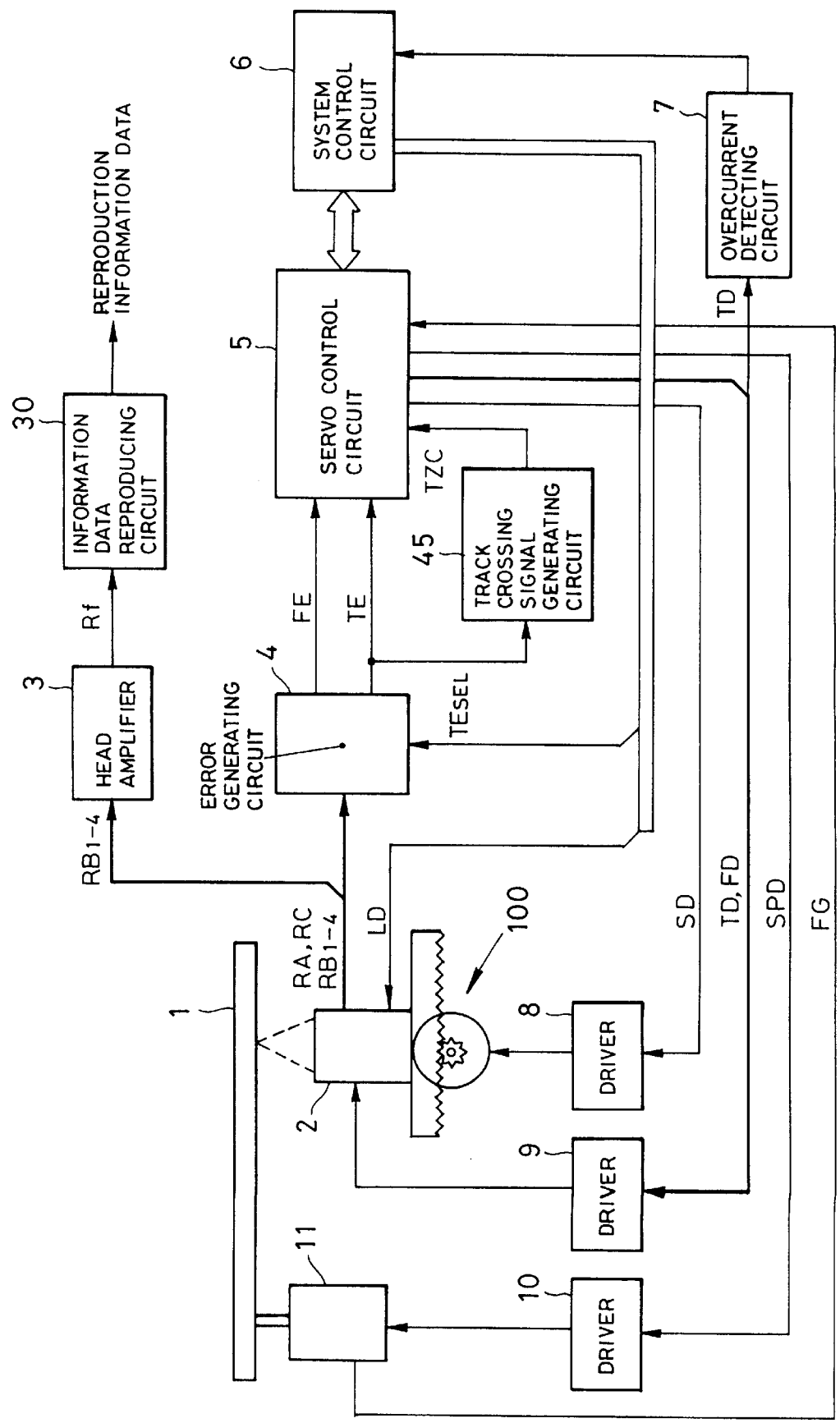
FIG. 1 is a diagram schematically showing the construction of a disc player in which a feed velocity control apparatus for a velocity control of an information reading point according to the invention is provided.

FIG. 1 is a diagram schematically showing the construction of a disc player on which a feed velocity control apparatus for a velocity control of an information reading point according to the invention is mounted.

In FIG. 1, for example, a pit train representing information data (audio data, video data, and computer data) is formed along a spiral recording track or concentric recording tracks on the recording surface of a recording disc 1 such as a DVD or a CD.

Figure 2:
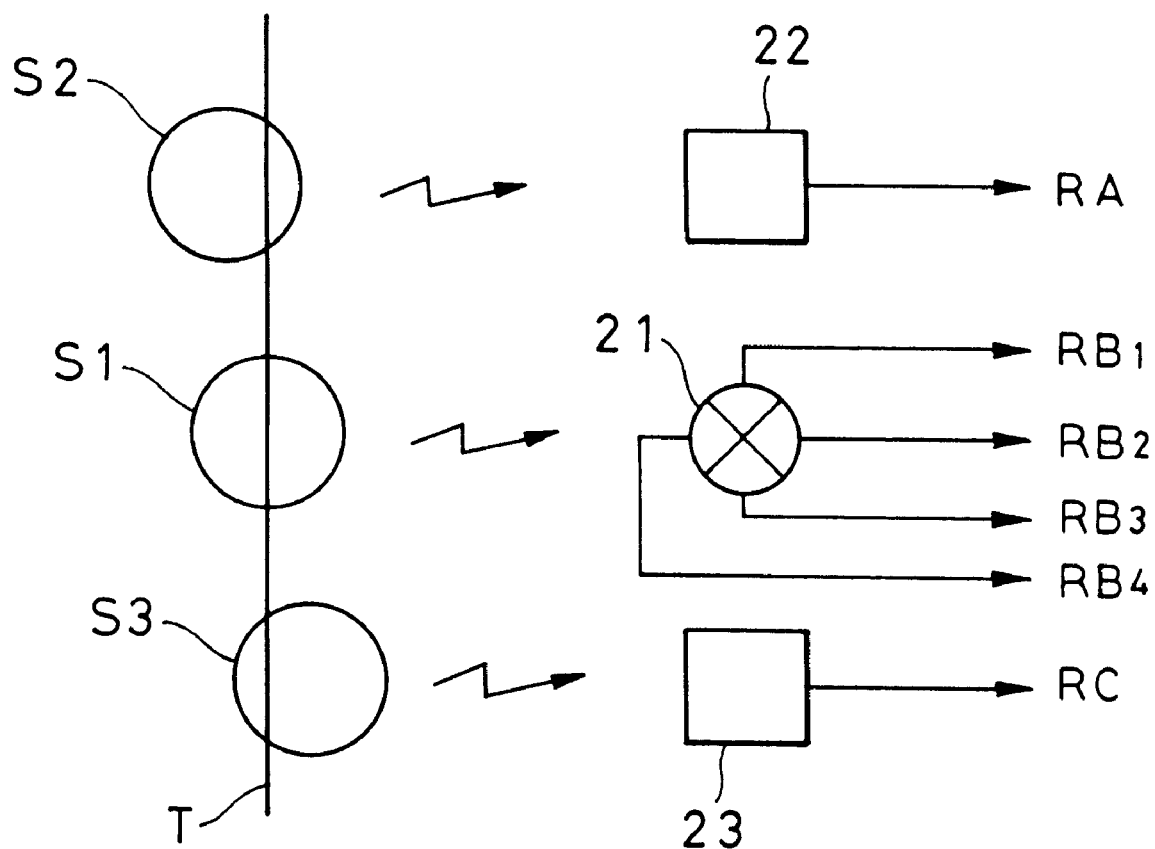
FIG. 2 is a diagram showing the relationship between a positional relation among beam spots S1 to S3 for recording tracks and each of photodetectors 21 to 23, respectively.

As shown in the left side portion of FIG. 2, mounted on a pickup 2 is a light beam generator (not shown) for forming beam spots S1, S2, and S3 onto a recording track T by irradiating three light beams onto the recording surface of the recording disc 1. As shown in FIG. 2, the beam light generator is previously attached in such a manner that the center of the beam spot S1 is formed on the recording track and the centers of the beam spots S2 and S3 are formed at positions which are deviated on the disc's inner rim side and the outer rim side of the recording track, respectively.

Photodetectors 21 to 23 each for receiving the reflected light by the irradiation of the beam light and converting it into an electric signal are further mounted on the pickup 2 as shown in the right part of FIG. 2.

As shown in FIG. 2, the photodetector 21 has four independent photodetector elements. The four independent photodetector elements receive the reflected light by the beam spot S1 as shown in FIG. 2, convert it into the electric signals, and generate them as read signals $RB_1$ to $RB_4$, respectively. The photodetector 22 receives the reflected light by the beam spot S2 as shown in FIG. 2, converts it into the electric signal, and generates it as a read signal RA. The photodetector 23 receives the reflected light by the beam spot S3 as shown in FIG. 2, converts it into the electric signal, and generates it as a read signal RC. Whether the beam irradiation of the photodetectors 21 to 23 is performed or not is controlled in accordance with a beam on/off control signal LD supplied from a system control circuit 6, respectively.

An optical mechanism (not shown) for guiding each beam light onto the recording track of the recording disc 1 through an objective lens (not shown) as an information reading point and guiding the reflected light by the beam spot onto the photodetector 21 through the objective lens and a cylindrical lens (not shown) is mounted on the pickup 2. A tracking actuator (not shown) for deviating the direction of the objective lens as an information reading point in the disc radial direction and a focusing actuator (not shown) for adjusting a focal position of the beam spot are further mounted on the pickup 2.

With the above construction, the pickup 2 reads the recording information from the recording disc 1 and supplies the obtained read signals RA, $RB_1$ to $RB_4$, and RC to a head amplifier 3 and an error generating circuit 4.

The head amplifier 3 obtains the sum of the read signals $RB_1$ to $RB_4$ supplied from the pickup 2 and supplies the signal obtained by amplifying the sum to a desired level as an information read signal Rf to an information data reproducing circuit 30.

The information data reproducing circuit 30 binarizes the information read signal Rf and, thereafter, performs a demodulation and an error correcting process, thereby reconstructing the data recorded on the recording disc 1. The information data reproducing circuit 30 further performs an information (video, audio, computer data) decoding process to the reconstructed data, thereby reproducing the information data and generating it as reproduction information data.

The error generating circuit 4 generates a focusing error signal FE and a tracking error signal TE on the basis of the read signals RA, $RB_1$ to $RB_4$, and RC supplied from the pickup 2 and transmits them to a servo control circuit 5. The error generating circuit 4 further supplies the tracking error signal TE to a track crossing signal generating circuit 45.

Figure 3:
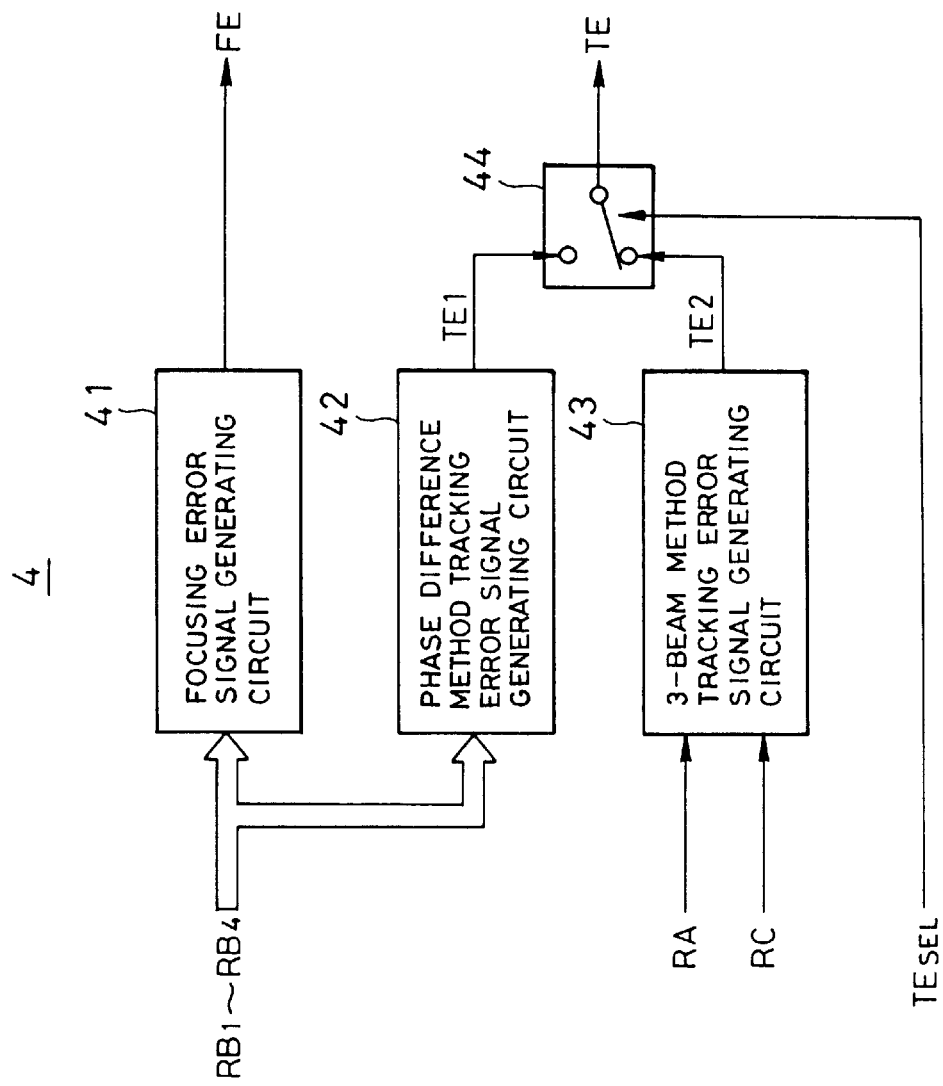
FIG. 3 is a diagram showing the structure of an error generating circuit 4.

FIG. 3 is a diagram showing an internal construction of the error generating circuit 4.

In FIG. 3, a focusing error signal generating circuit 41 obtains the sums of the outputs of the photodetector elements which face among the four independent photodetector elements in the photodetector 21, respectively, and generates a difference signal between the sums as a focusing error signal FE.

For example, the focusing error signal FE is obtained by performing the following arithmetic operation.

$$FE=(RB_1+RB_3)-(RB_2+RB_4)$$

A phase difference method tracking error signal generating circuit 42 obtains the sums of the outputs of the photodetector elements which face among the four independent photodetector elements in the photodetector 21, respectively, and generates a phase difference between the sums as a tracking error signal. That is, a phase difference between $(RB_1+RB_3)$ and $(RB_2+RB_4)$ is obtained as a tracking error signal. The phase difference method tracking error signal generating circuit 42 supplies the tracking error signal as a first tracking error signal TE1 to a selector 44.

A 3-beam method tracking error signal generating circuit 43 generates a difference between the read signal RA supplied from the photodetector 22 and the read signal RC supplied from the photodetector 23 as a tracking error signal. The 3-beam method tracking error signal generating circuit 43 supplies the tracking error signal as a second tracking error signal TE2 to the selector 44.

The selector 44 alternatively selects either the first tracking error signal TE1 or the second tracking error signal TE2 corresponding to a tracking error selection signal $TE_{SEL}$ supplied from the system control circuit 6 and generates it as a final tracking error signal TE.

The track crossing signal generating circuit 45 generates a binary track crossing signal TZC which is set to the logical level "1" when a signal level of the tracking error signal TE obtained while the pickup 2 is jumping the tracks is larger than a predetermined threshold value and is set to the logical level "0" when it is smaller than the predetermined threshold value. The track crossing signal generating circuit 45 supplies the track crossing signal TZC to the servo control circuit 5. That is, the track crossing signal generating circuit 45 generates a pulse signal which is shifted to, for example, the logical level "0"→"1"→"0" each time the pickup 2 transverses the recording tracks at the time of the track jump and transmits it as a track crossing signal TZC.

In order to drive a spindle motor 11 to rotate the recording disc 1 at a predetermined speed of rotation, the servo control circuit 5 generates a spindle driving signal SPD on the basis of a frequency signal FG showing the present speed of rotation of the spindle motor 11 and supplies it to the spindle motor 11 through a driver 10. The spindle motor 11 rotates the recording disc 1 at a speed of rotation according to the spindle driving signal SPD. In this instance, the spindle motor 11 detects the speed of rotation at the present time point and supplies the frequency signal FG corresponding to the speed of rotation to the servo control circuit 5.

The servo control circuit 5 generates a focusing driving signal FD on the basis of the focusing error signal FE and supplies it to the pickup 2 through a driver 9. The focusing actuator mounted on the pickup 2, therefore, adjusts the focal positions of the beam spots S1 to S3 in accordance with the focusing driving signal FD. The servo control circuit 5 generates a tracking driving signal TD on the basis of the tracking error signal TE and track crossing signal TZC and supplies it to the pickup 2 through the driver 9. The tracking actuator mounted on the pickup 2, consequently, deviates the positions of the beam spots S1 to S3 in the disc radial direction by a driving current based on the tracking driving signal TD.

The servo control circuit 5 further generates a slider driving signal SD on the basis of the tracking error signal TE and track crossing signal TZC and supplies it to a slider 100 through a driver 8. The slider 100, consequently, transports the pickup 2 in the disc radial direction at a velocity according to the driving current based on the slider driving signal SD.

An overcurrent detecting circuit 7 detects whether the driving current by the slider driving signal SD exceeds a rated current value and is in an overcurrent state or not and supplies a detection result to the system control circuit 6. The system control circuit 6 controls the whole disc player and generates various control signals (which will be explained later) in accordance with various operating instructions from the user and an operating situation of the present disc player.

The servo control circuit 5 performs servo control operations according to the various control signals generated from the system control circuit 6.

Figure 4:
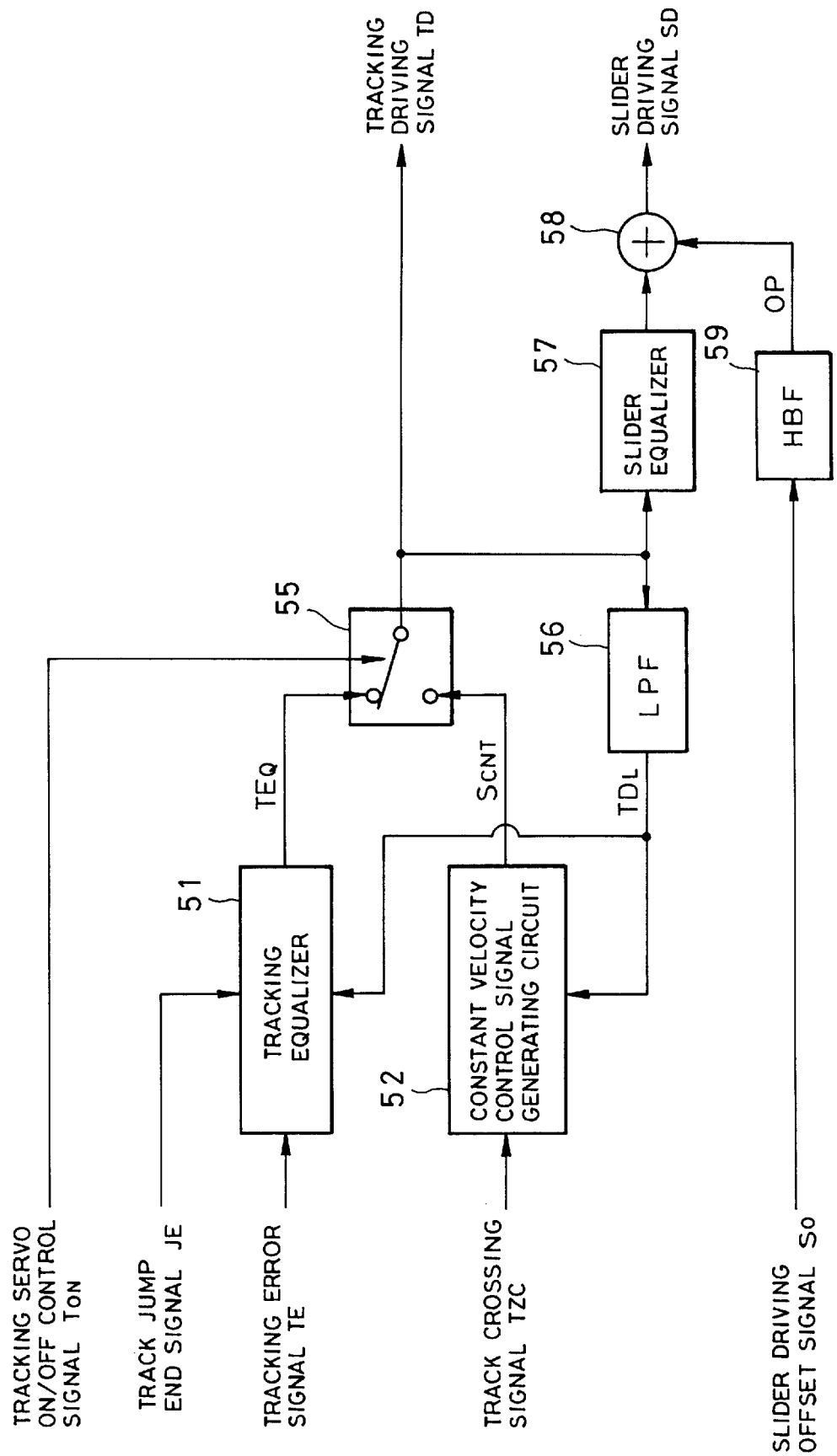
FIG. 4 is a diagram showing the structure of a servo control circuit 5.

FIG. 4 is a diagram showing an internal construction of the servo control circuit 5.

In FIG. 4, the description of a construction of a focus control unit which is not directly concerned with the velocity control of the information reading point according to the invention is omitted.

In FIG. 4, when a track jump end signal JE at the logical level "0" showing the timing other than the end timing of the track jump is supplied from the system control circuit 6, a tracking equalizer 51 compensates the tracking error signal TE generated from the error generating circuit 4 so as to have frequency characteristics suitable for a tracking servo and supplies a resultant compensation tracking error signal $T_{EQ}$ to a selector 55. When the track jump end signal JE at the logical level "1" showing the end timing of the track jump is supplied, the tracking equalizer 51 fetches a velocity error low band signal $TD_L$ supplied from an LPF (low pass filter) 56, which will be explained later, and executes the compensating process on the basis of its value.

Figure 5:
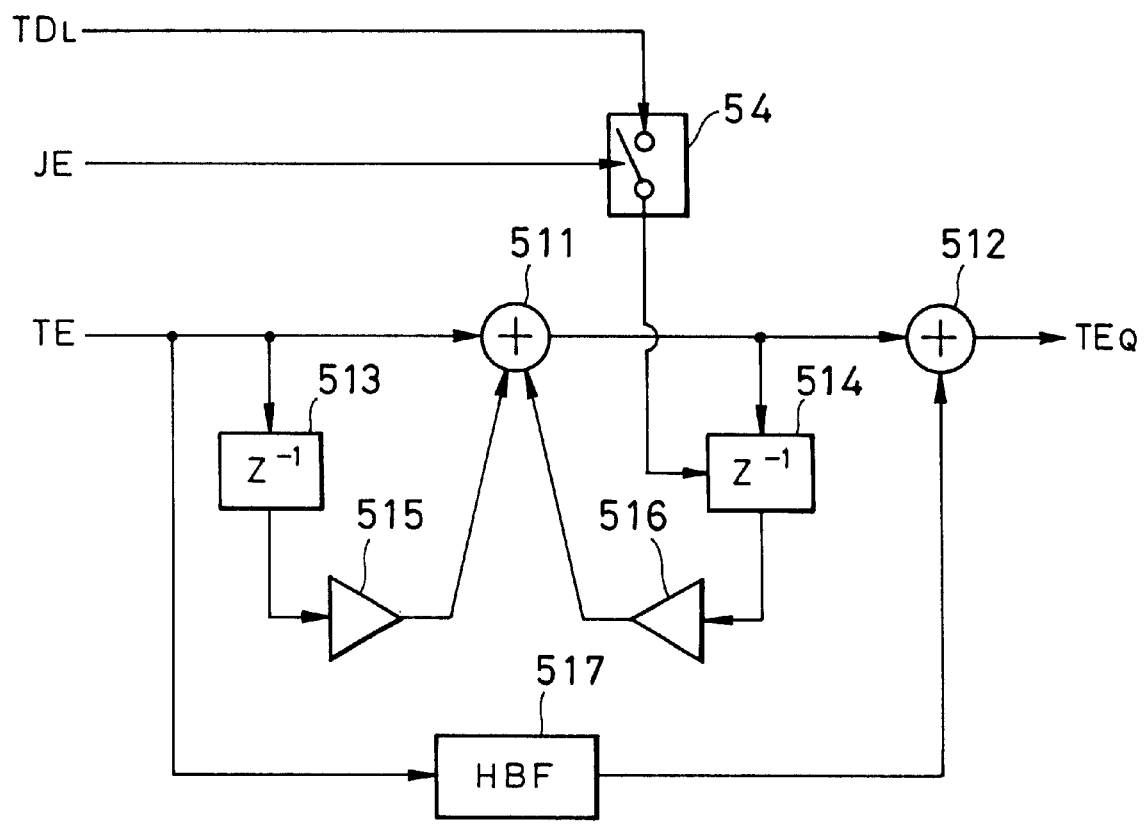
FIG. 5 is a diagram showing the structure of a tracking equalizer 51.

FIG. 5 is a diagram showing an internal construction of the tracking equalizer 51.

In FIG. 5, a delay element 513 fetches the tracking error signal TE, delays it by a predetermined time, and supplies it to a coefficient multiplier 515. The coefficient multiplier 515 multiplies the tracking error signal TE supplied which was delayed by the predetermined time by the delay element 513 and sent by a predetermined first coefficient and sends a resultant first coefficient multiplication signal to an adder 511. The adder 511 adds the tracking error signal TE, the first coefficient multiplication signal, and a second coefficient multiplication signal supplied from a coefficient multiplier 516, which will be explained later, and sends a resultant addition signal to each of an adder 512 and a delay element 514.

A switch 54 is turned off when the track jump end signal JE at the logical level "0" showing the timing other than the end timing of the track Jump is supplied from the system control circuit 6. In this instance, the delay element 514 sequentially fetches the addition signal supplied from the adder 511, delays it by a predetermined time, and supplies it to the coefficient multiplier 516. The switch 54 is turned on when the track jump end signal JE at the logical level "1" showing the end timing of the track jump is supplied from the system control circuit 6 and transmits the velocity error low band signal $TD_L$ supplied from the LPF 56 to the delay element 514. In this instance, the delay element 514 fetches the velocity error low band signal $TD_L$ supplied through the switch 54 in place of the addition signal supplied from the adder 511, delays the signal $TD_L$ by a predetermined time, and sends the delayed signal to the coefficient multiplier 516. The coefficient multiplier 516 multiplies the addition signal which was delayed by the predetermined time by the delay element 514 and supplied by a predetermined second coefficient, thereby obtaining the second coefficient multiplication signal and transmitting it to the adder 511.

A low boost filter to emphasize a predetermined low band component of the tracking error signal TE is formed by a construction of the delay elements 513 and 514, coefficient multipliers 515 and 516, and adder 511. That is, the addition signal generated from the adder 511 is a signal obtained by emphasizing the predetermined low band component of the tracking error signal TE.

An HBF (high boost filter) 517 supplies the signal obtained by emphasizing a predetermined high band component of the tracking error signal TE to the adder 512. The adder 512 adds the tracking error signal in which the predetermined high band component has been emphasized by the HBF 517 and the tracking error signal in which the predetermined low band component has been emphasized by the low boost filter and generates a resultant addition signal as a compensation tracking error signal $T_{EQ}$.

As mentioned above, in the tracking equalizer 51 shown in FIG. 5, the high band component and low band component in the tracking error signal TE are respectively emphasized by the low boost filter and high boost filter, thereby performing the compensating process suitable for the tracking servo. In this instance, in the tracking equalizer 51, when the track jumping operation of the pickup 2 by the slider 100 is finished and the tracking servo is shifted to the closing state, the velocity error low band signal $TD_L$ is temporarily forcibly fetched into the low boost filter just before the tracking servo is closed. The velocity error low band signal $TD_L$ appearing during the track jumping operation indicates an average deviating position of the objective lens as an information reading point which is driven by the tracking actuator. By fetching the deviating position just before the track jump is finished, the continuity with the tracking error signal low band component when the tracking servo is closed can be maintained.

A constant velocity control signal generating circuit 52 shown in FIG. 4 generates a constant velocity control signal $S_{CNT}$ so as to set the present feed velocity of the slider 100 which is presumed on the basis of the track crossing signal TZC supplied from the track crossing signal generating circuit 45 to a desired constant velocity $V_c$ and sends it to the selector 55. The constant velocity control signal generating circuit 52 sets the velocity error low band signal $TD_L$ supplied from the LPF 56 to the constant velocity control signal $S_{CNT}$ when the present feed velocity of the slider 100 exceeds a predetermined range including the constant velocity $V_c$ as mentioned above and supplies the signal $S_{CNT}$ to the selector 55.

Figure 6:
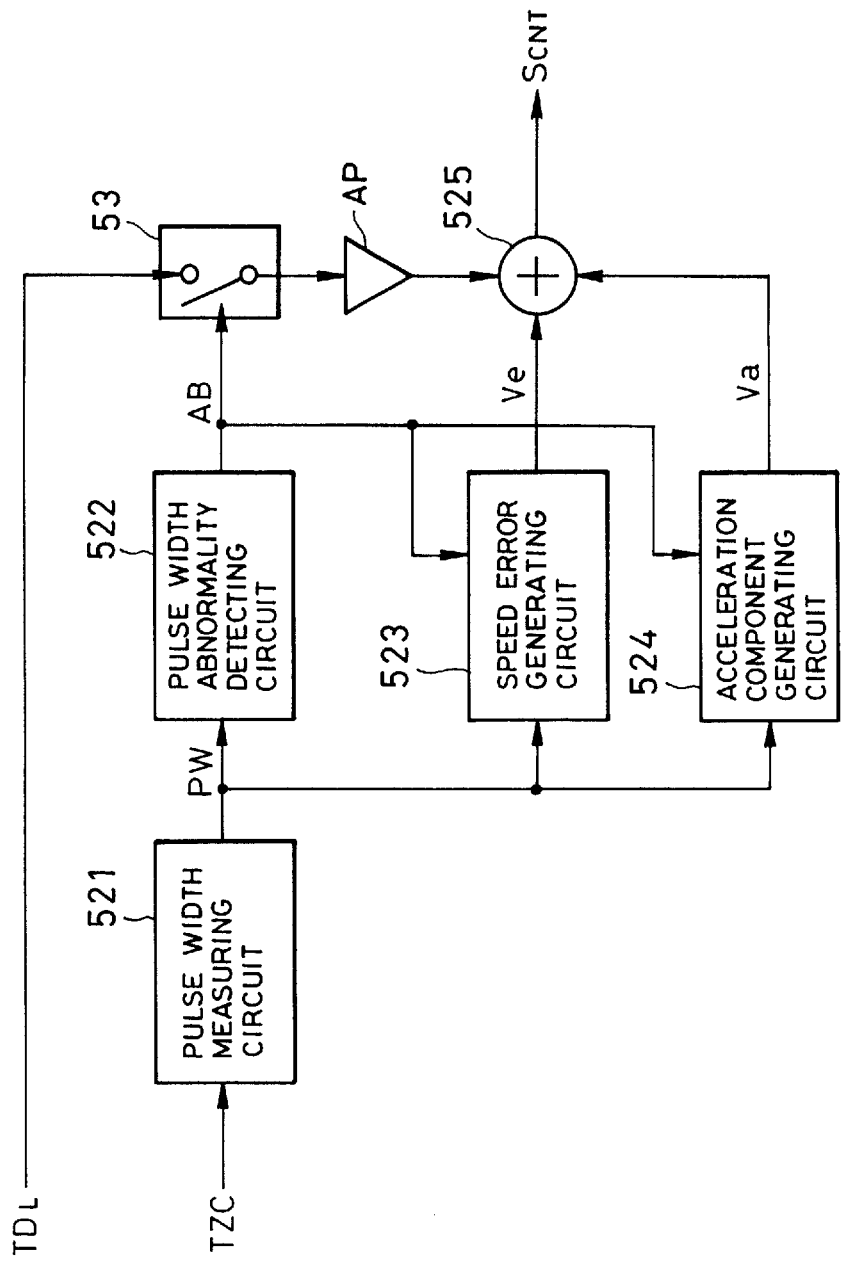
FIG. 6 is a diagram showing the structure of a constant velocity control signal generating circuit 52.

FIG. 6 is a diagram showing an internal construction of the constant velocity control signal generating circuit 52.

In FIG. 6, a pulse width measuring circuit 521 successively measures a pulse width of the track crossing signal TZC supplied from the track crossing signal generating circuit 45 and sends a pulse width signal PW showing the measured pulse width to each of a pulse width abnormality detecting circuit 522, a velocity error generating circuit 523, and an acceleration component generating circuit 524. In this instance, the value of the pulse width signal PW corresponds to the feed velocity of the slider 100. That is, the slider 100 transports at a high speed when the value of the pulse width signal PW is small and transports at a low speed when it is large.

The pulse width abnormality detecting circuit 522 discriminates whether the present feed velocity of the slider 100 presumed on the basis of the pulse width signal PW lies within a predetermined velocity range or not, and supplies an abnormality detection signal AB having the logical level according to its discrimination result to each of a switch 53, the velocity error generating circuit 523, and the acceleration component generating circuit 524. For example, when the present feed velocity of the slider 100 lies within the predetermined velocity range, the abnormality detection signal AB at the logical level "0" showing "absence of abnormality", or when it is out of the predetermined velocity range, the abnormality detection signal AB at the logical level "1" showing "presence of abnormality" is supplied to each of the switch 53, velocity error generating circuit 523, and acceleration component generating circuit 524.

The velocity error generating circuit 523 obtains a difference between the pulse width signal PW corresponding to the present feed velocity of the slider 100 and the pulse width corresponding to the predetermined constant velocity $V_c$ as a velocity error component and transmits it as a velocity error signal $V_e$ to an adder 525. When the abnormality detection signal AB at the logical level "1" showing "presence of abnormality" is supplied from the pulse width abnormality detecting circuit 522, the velocity error generating circuit 523 invalidates the velocity error component obtained by the difference and supplies the velocity error signal $V_e$ at the "0" level to the adder 525. In this instance, the constant velocity $V_c$ is included within the predetermined velocity range in the pulse width abnormality detecting circuit 522.

The acceleration component generating circuit 524 obtains a difference between the present feed velocity of the slider 100 which is presumed on the basis of the pulse width signal PW and the previous feed velocity as an acceleration component and sends it as an acceleration signal $V_a$ to the adder 525. When the abnormality detection signal AB at the logical level "1" showing "presence of abnormality" is supplied from the pulse width abnormality detecting circuit 522, the acceleration component generating circuit 524 invalidates the acceleration component obtained by the difference and supplies the acceleration signal $V_a$ at the "0" level to the adder 525.

The switch 53 is turned off when the abnormality detection signal AB at the logical level "0" showing "absence of abnormality" is supplied, is turned on when the abnormality detection signal AB at the logical level "1" showing "presence of abnormality" is supplied, and transmits the velocity error low band signal $TD_L$ supplied from the LPF 56 to the adder 525 through an amplifier AP.

The adder 525 adds the velocity error signal $V_e$, the acceleration signal $V_a$, and the signal supplied from the amplifier AP and generates a resultant addition signal as a constant velocity control signal $S_{CNT}$. That is, when the abnormality detection signal AB showing "absence of abnormality" is supplied from the pulse width abnormality detecting circuit 522, the adder 525 generates a signal obtained by adding the velocity error signal $V_e$ and acceleration signal $V_a$ as a constant velocity control signal $S_{CNT}$.

When the abnormality detection signal AB showing "presence of abnormality" is supplied from the pulse width abnormality detecting circuit 522, the adder 525 generates the velocity error low band signal $TD_L$ supplied from the LPF 56 as a constant velocity control signal $S_{CNT}$ as it is.

With the above construction, the constant velocity control signal generating circuit 52 generates the constant velocity control signal $S_{CNT}$ so as to transport (to allow the pickup 2 to jump the recording tracks) the slider 100 at the predetermined constant velocity $V_c$.

The selector 55 shown in FIG. 4 alternatively selects either the constant velocity control signal $S_{CNT}$ supplied from the constant velocity control signal generating circuit 52 or the compensation tracking error signal $T_{EQ}$ supplied from the tracking equalizer 51 corresponding to a tracking servo on/off control signal $T_{ON}$ and sends it as a tracking driving signal TD to each of the driver 9, LPF 56, and a slider equalizer 57. For example, when the tracking servo on/off control signal $T_{ON}$ at the logical level "1" to turn on the tracking servo is supplied from the system control circuit 6, the selector 55 selects the compensation tracking error signal $T_{EQ}$ and generates it as a tracking driving signal TD. When the tracking servo on/off control signal $T_{ON}$ at the logical level "0" to turn off the tracking servo is supplied from the system control circuit 6 by the constant velocity track jump or the like, the selector 55 selects the constant velocity control signal $S_{CNT}$ and generates it as a tracking driving signal TD.

The LPF 56 extracts a low band component of the tracking driving signal TD and supplies it as a velocity error low band signal $TD_L$ to each of the constant velocity control signal generating circuit 52 and tracking equalizer 51.

The slider equalizer 57 compensates the tracking driving signal TD to frequency characteristics suitable for the slider servo and supplies a resultant compensation slider signal to an adder 58.

An HBF (high boost filter) 59 is constructed by, for example, a differentiating circuit, generates an offset driving pulse OP to drive the slider 100 at a constant velocity in response to a head edge timing of a slider driving offset signal $S_o$ supplied from the system control circuit 6, and sends it to the adder 58. The adder 58 adds the offset driving pulse OP supplied from the HBF 59 to the compensation slider signal supplied from the slider equalizer 57 and transmits a resultant addition signal as a slider driving signal SD to the driver 8 shown in FIG. 1.

The LPF 56 shown in FIG. 4 can be used in common with the slider equalizer 57.

The velocity error low band signal $TD_L$ as an output of the LPF 56 is used for a kick or brake control at the time of the track jump, a slide brake detection at the time of the closure of the tracking servo, and the like.

Although the internal construction of the tracking equalizer 51 is shown in FIG. 5, the tracking equalizer 51 is not limited to the primary filter construction but can be embodied by a form such as secondary, parallel, or serial filter.

The operation which is embodied in the construction shown in FIGS. 1 to 6 as mentioned above will now be described.

First, the operation of the tracking equalizer 51 will be described with reference to FIG. 7.

Figure 7:
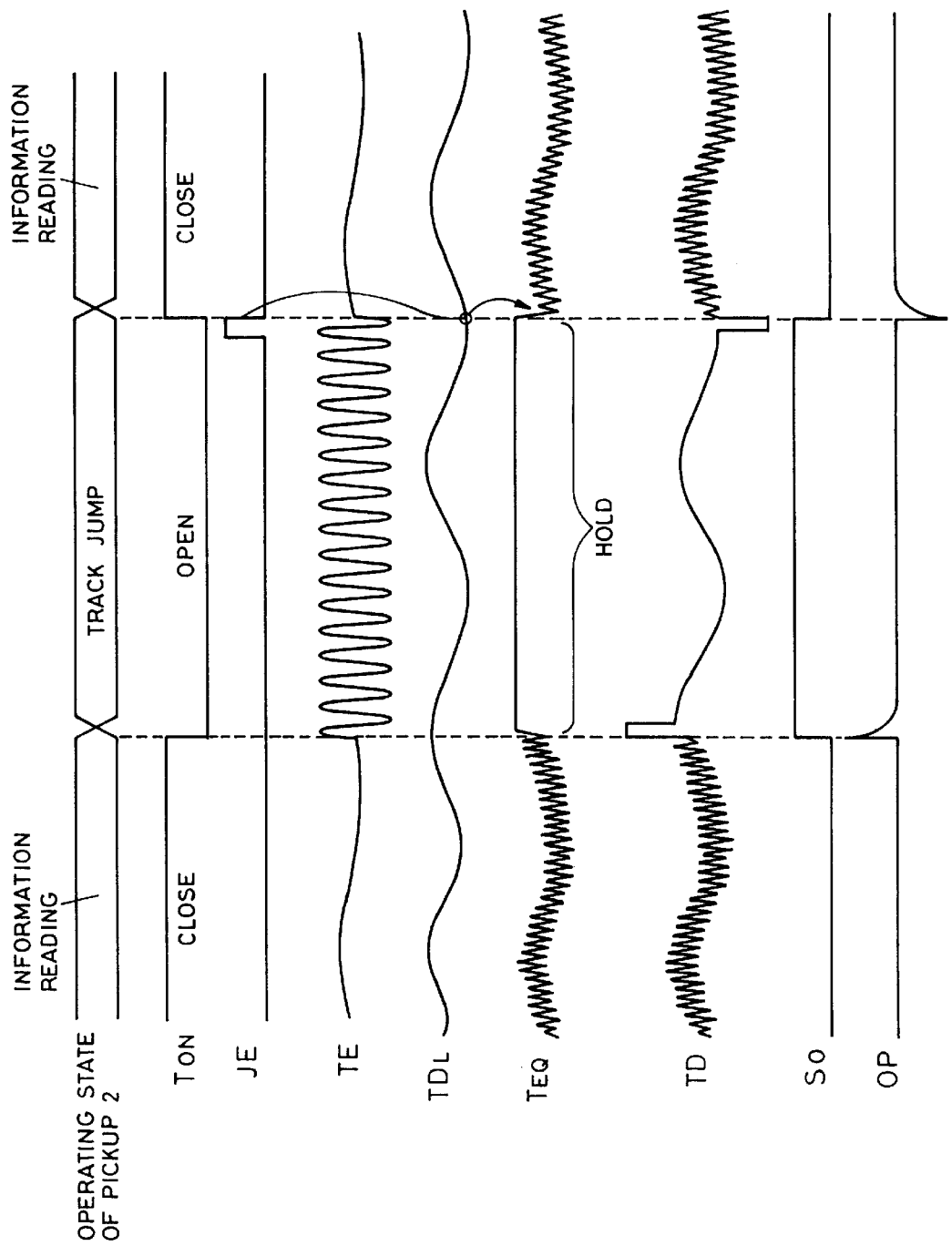
FIG. 7 is a diagram showing operation waveforms of the tracking equalizer 51.

In FIG. 7, the tracking servo on/off control signal $T_{ON}$ at the logical level "1" is supplied for an ordinary information reading operation period by the pickup 2 and the tracking servo is in a closing state. In this instance, the selector 55 in FIG. 4 selects the compensation tracking error signal $T_{EQ}$ supplied from the tracking equalizer 51 and generates it as a tracking driving signal TD. The pickup 2, consequently, reads the recording information from the recording tracks while allowing the objective lens of the pickup 2 to trace the recording tracks on the recording disc 1. When the pickup 2 is subsequently switched from the information reading operation to the track jumping operation, the tracking servo on/off control signal $T_{ON}$ at the logical level "0" is supplied and the tracking servo is opened. At this time, the tracking equalizer 51 stops the process. Subsequently, when the pickup 2 is switched again from the track jumping operation to the information reading operation, the tracking servo on/off control signal $T_{ON}$ at the logical level "1" is supplied and the tracking servo is closed. At this time, the track jump end signal JE at the logical level "1" showing the end timing of the track jump is supplied from the system control circuit 6 just before the switching from the track jumping operation to the information reading operation is performed. In response to the signal JE, the velocity error low band signal $TD_L$ as an output of the LPF 56 is forcibly fetched into the tracking equalizer 51 and its value is immediately reflected to the compensation tracking error signal $T_{EQ}$.

Even if the low band component of the tracking error signal just before the track jump, therefore, largely differs from the value just after the jump due to the influence by the disc eccentricity or the like, it is smoothly coupled to the value of the low band component of the tracking error signal which is obtained just after the track jump.

The operation of the HBF 59 will now be described with reference to FIGS. 4 and 7.

At the time of the track jump, the slider 100 and tracking actuator as transporting means for transporting the information reading point of the pickup 2 are driven on the basis of the constant velocity control signal $S_{CNT}$ generated from the constant velocity control signal generating circuit 52 as shown in FIG. 4. In this instance, the slider 100 is driven by the compensation slider signal generated by the slider equalizer 57 on the basis of the constant velocity control signal $S_{CNT}$. A slider motor provided for the slider 100, however, has a dead zone (cannot respond to the supplied driving signal) level caused due to a gear ratio or the like.

Just after the start of the track jump, therefore, only the tracking actuator in the slider and the tracking actuator serving as transporting means is driven in advance, so that a reference position of the objective lens as an information reading point of the pickup 2 and a reference position of the slider are deviated.

As shown in FIG. 7, therefore, the system control circuit 6 supplies the offset signal $S_o$ at a predetermined level to the HBF 59 for a period of time from the start of the track jump to the end thereof. In this instance, since the HBF 59 operates as what is called a differentiating circuit, it supplies the offset driving pulse OP having the predetermined level to the adder 58 only in the steep transition portions of the offset signal $S_o$, namely, in the leading and trailing portions of the offset signal $S_o$ which is applied in a rectangular waveform as shown in FIG. 7. The signal obtained by adding the offset driving pulse OP to the compensation slider signal becomes the slider driving signal SD.

If a level that is equal to or higher than the dead zone level of the slider motor is set as a predetermined level, the objective lens as an information reading point and the slider 100 can be driven in an apparently integrated manner by the operation of the HBF 59, particularly, just after the track jump.

The constant velocity control during the track jump by the constant velocity control signal generating circuit 52 will now be described with reference to FIGS. 8 and 9.

Figure 8:
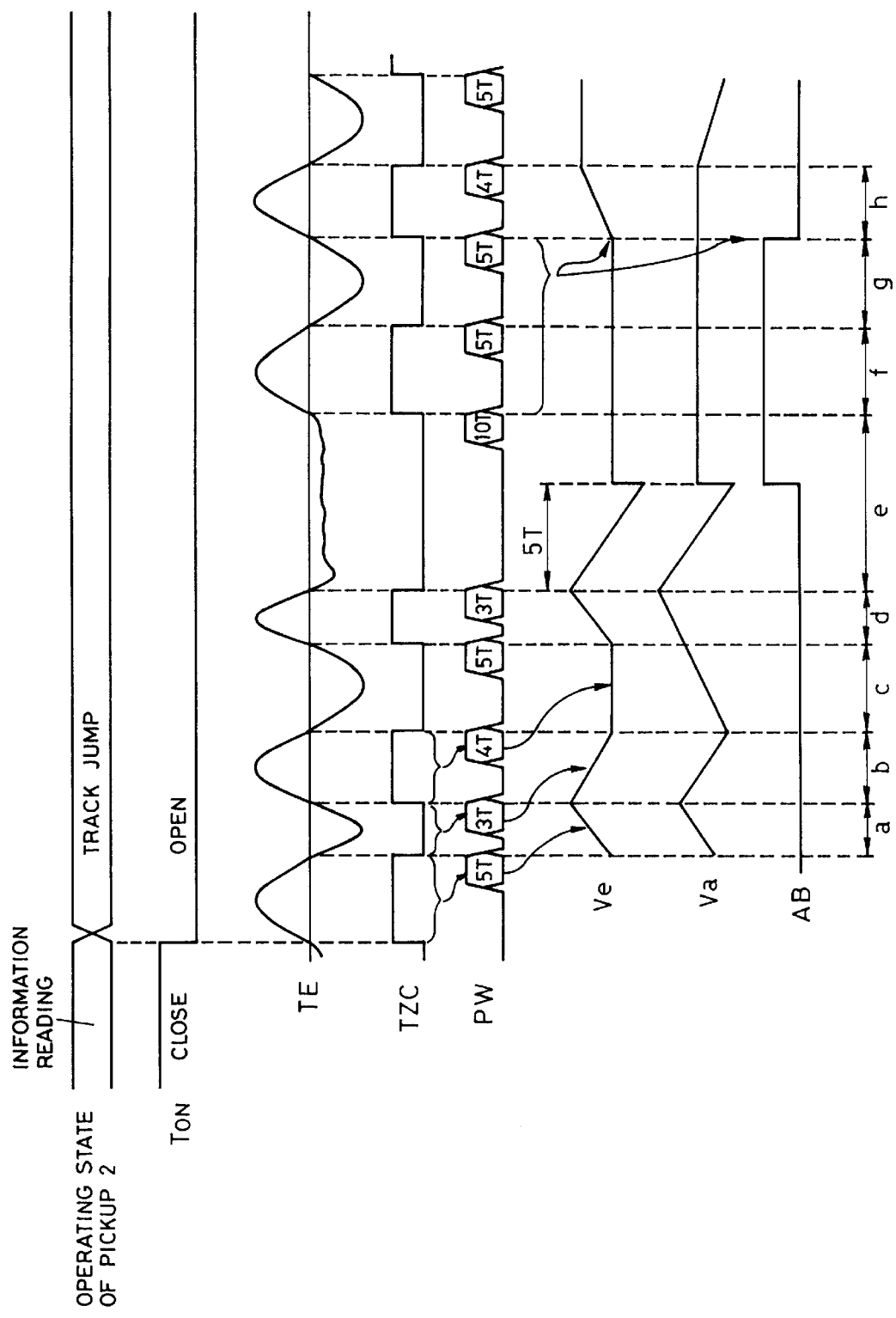
FIG. 8 is a diagram showing operation waveforms of the constant velocity control signal generating circuit 52.

FIG. 8 is a diagram showing operation waveforms of the constant velocity control signal generating circuit 52 when the track crossing signal TZC is dropped due to the influence by the scratches or the like on the recording surface of the recording disc 1. In the embodiment, it is assumed that a value of the pulse width signal PW which is measured by the pulse width measuring circuit 521 when the slider 100 is transported at the predetermined velocity $V_c$ is equal to "4T". Further, it is assumed that a range of the pulse width signal PW which is regarded to be normal by the pulse width abnormality detecting circuit 522 lies within a range of "3T" to "5T".

In FIG. 8, when the operating state of the pickup 2 is first switched from the information reading operation to the track jumping operation, the tracking servo on/off control signal $T_{ON}$ at the logical level "0" is supplied from the system control circuit 6 and the tracking servo is opened. The selector 55 in FIG. 4, consequently, supplies the constant velocity control signal $S_{CNT}$ generated from the constant velocity control signal generating circuit 52 to the tracking actuator (not shown) of the pickup 2 through the driver 9 and sends it to the slider 100 through the slider equalizer 57, adder 58, and driver 8.

The slider 100 and the tracking actuator as transporting means, therefore, are independently driven so as to transport the information reading point of the pickup 2 in the disc radial direction at the velocity according to the constant velocity control signal $S_{CNT}$. For this period of time, each time the information reading point of the pickup 2 transverses the recording tracks on the recording disc, the tracking error signal TE having a level change of the logical level "0"→"1"→"0" (or "1"→"0"→"1") is obtained. The pulse width measuring circuit 521 in the constant velocity control signal generating circuit 52 successively measures the pulse width of the track crossing signal TZC corresponding to the level change of the tracking error signal TE and generates it as a pulse width signal PW. The velocity error generating circuit 523 presumes a feed velocity of the information reading point in the disc radial direction on the basis of the pulse width signal PW and generates a difference between the feed velocity and the desired constant velocity $V_c$ as a velocity error signal $V_e$.

For example, as shown in FIG. 8, if the pulse width signal PW is equal to "5T", since it lies within the range of "3T" to "5T", the pulse width abnormality detecting circuit 522 generates the abnormality detection signal AB at the logical level "0" showing "absence of abnormality". In this instance, the fact that the pulse width signal PW is equal to "5T" denotes that the present feed velocity is slower than the constant velocity $V_c$. The velocity error generating circuit 523, therefore, raises the velocity error signal $V_e$ in order to increase the feed velocity at the next stage (interval a in the diagram). When the pulse width signal PW is subsequently set to "3T", since it also lies within the range of "3T" to "5T", the pulse width abnormality detecting circuit 522 generates the abnormality detection signal AB at the logical level "0" showing "absence of abnormality". In this instance, the fact that the pulse width signal PW is equal to "3T" denotes that the present feed velocity is faster than the constant velocity $V_c$. The velocity error generating circuit 523, therefore, drops the velocity error signal $V_e$ in order to decrease the feed velocity at the next stage (interval b in the diagram). When the pulse width signal PW is subsequently set to "4T", since it also lies within the range of "3T" to "5T", the pulse width abnormality detecting circuit 522 generates the abnormality detection signal AB at the logical level "0" showing "absence of abnormality". In this instance, the fact that the pulse width signal PW is equal to "4T" denotes that the present feed velocity is equal to the constant velocity $V_c$. The velocity error generating circuit 523, therefore, generates the previous velocity error signal $V_e$ as it is at the next stage (interval c in the diagram).

In parallel with the above operation, the acceleration component generating circuit 524 in the constant velocity control signal generating circuit 52 discriminates whether the present feed velocity has changed to the acceleration side or the deceleration side on the basis of the pulse width signal PW, and generates the acceleration signal $V_a$ to decelerate when it is accelerating and to accelerate when it is decelerating.

For example, in FIG. 8, when the pulse width signal PW is shifted from "5T" to "3T", the feed velocity of the information reading point is accelerated by "2T". To decelerate it, therefore, the acceleration component generating circuit 524 drops the acceleration signal $V_a$ (interval b in the diagram). Subsequently, when the pulse width signal PW is shifted from "3T" to "4T", the feed velocity of the information reading point is decelerated by "1T". To accelerate it, therefore, the acceleration component generating circuit 524 raises the acceleration signal $V_a$ (interval c in the diagram).

As shown in an interval e in FIG. 8, when the amplitude level of the tracking error signal TE decreases due to the influence by the scratches or the like on the recording surface of the recording disc 1, the signal edge of the track crossing signal TZC is not obtained. In the interval e in FIG. 8, thus, the pulse width of the track crossing signal TZC is equal to "10T" and longer than "5T". The pulse width abnormality detecting circuit 522 generates the abnormality detection signal AB at the logical level "1" showing "presence of abnormality" at a point when the value of the pulse width signal PW exceeds "5T". In response to it, outputs of both the velocity error generating circuit 523 and acceleration component generating circuit 524 are reset and the velocity error signal $V_e$ and acceleration signal $V_a$ at the "0" level are generated, respectively. For this period of time, the velocity error low band signal $TD_L$ as an output of the LPF 56 is supplied to the tracking actuator of the pickup 2 through the switch 53, amplifier AP, adder 525, selector 55, and driver 9 and supplied to the slider 100 through the slider equalizer 57 and adder 58. That is, the constant velocity control of the slider 100 is performed by the velocity error low band signal $TD_L$ in place of the velocity error signal $V_e$ and acceleration signal $V_a$ obtained on the basis of the track crossing signal TZC.

That is, when the pulse width of the track crossing signal TZC exceeds "5T", the tracking actuator and the slider 100 as transporting means are driven by the tracking driving signal TD which is larger than it is needed so as to set the pulse width to "4T" corresponding to the constant velocity $V_c$. After that, therefore, even if the pulse width of the track crossing signal TZC is returned to the normal state, it is difficult to immediately settle the servo.

In the interval e where the pulse width of the track crossing signal TZC exceeds "5T", therefore, the feed control is executed by the slider driving signal SD generated on the basis of the velocity error low band signal $TD_L$ in place of the track crossing signal TZC.

After the elapse of the interval e in FIG. 8, when the pulse width of the track crossing signal TZC continuously lies within the predetermined range, namely, "3T" to "5T" twice as shown in intervals f and g, the pulse width abnormality detecting circuit 522 generates the abnormality detection signal AB at the logical level "0" showing "absence of abnormality", thereby cancelling the resetting operation.

Figure 9:
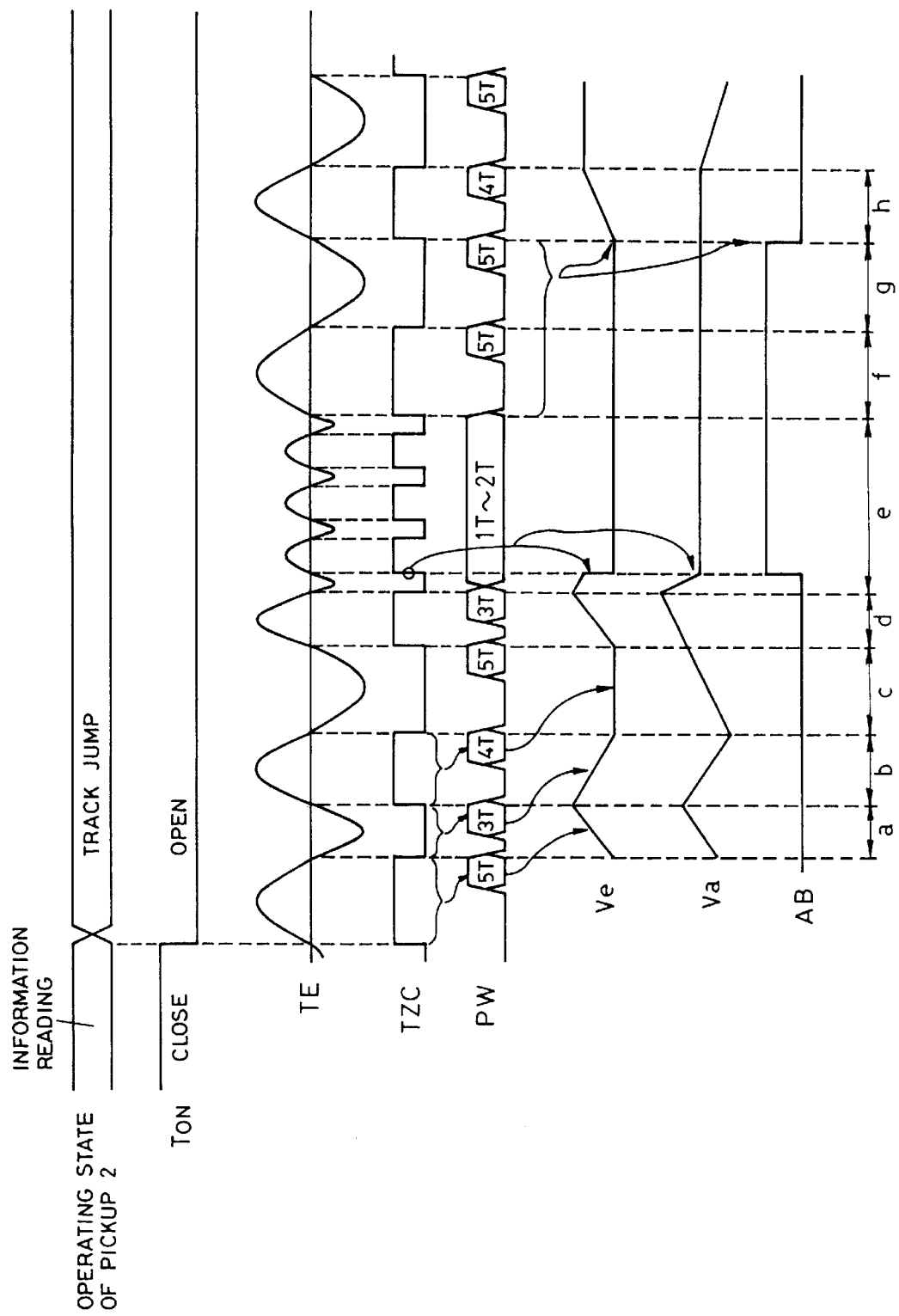
FIG. 9 is a diagram showing operation waveforms of the constant velocity control signal generating circuit 52.

FIG. 9 is a diagram showing operation waveforms of the constant velocity control signal generating circuit 52 in the case where an abnormal pulse train shorter than the pulse width "3T" has been multiplexed onto the track crossing signal TZC during the track jump due to the influence by noises or the like.

In the example shown in FIG. 9, since the operations regarding the portions except for the interval e are substantially the same as those in the case of FIG. 8, their descriptions are omitted.

In an interval e in FIG. 9, the pulse width abnormality detecting circuit 522 generates the abnormality detection signal AB at the logical level "1" showing "presence of abnormality" at a point when it is detected that the value of the pulse width signal PW is equal to "1T" or "2T" smaller than "3T". In response to it, the outputs of both the velocity error generating circuit 523 and acceleration component generating circuit 524 are reset and the velocity error signal $V_e$ and acceleration signal $V_a$ at the "0" level are generated, respectively. For this period of time, the velocity error low band signal $TD_L$ as an output of the LPF 56 is supplied to the tracking actuator of the pickup 2 through the switch 53, amplifier AP, adder 525, selector 55, and driver 9 and supplied to the slider 100 through the slider equalizer 57 and adder 58. That is, the feed control of the information reading point is performed by the velocity error low band signal $TD_L$ in place of the velocity error signal $V_e$ and acceleration signal $V_a$ obtained on the basis of the track crossing signal TZC.

That is, when the pulse width of the track crossing signal TZC is lower than "3T", the velocity servo is performed by the tracking driving signal TD which is larger than it is needed so as to set the pulse width to "4T" corresponding to the constant velocity $V_c$. Even if the pulse width of the track crossing signal TZC is returned to the normal state, it is difficult to immediately settle the servo.

For a period of time when the pulse width of the track crossing signal TZC is lower than "3T", therefore, the feed control is executed by the slider driving signal SD generated on the basis of the velocity error low band signal $TD_L$ in place of the track crossing signal TZC.

Although the embodiment has been mentioned with respect to the velocity servo when the pickup 2 is transported in the disc radial direction by a relatively long distance (thousands of tracks) by driving the slider 100 at the time of the track jump, the invention can be applied to the case of transporting the pickup by a relatively short distance (hundreds of tracks). That is, the invention is also effective in the case where the information reading point of the pickup 2 is allowed to jump the tracks only by a relatively short distance by driving only the tracking actuator without driving the slider 100.

As mentioned above, in the constant velocity control signal generating circuit 52, when the pulse width of the track crossing signal is out of the predetermined width range ("3T" to "5T"), the control mode is switched to the feed control of the information reading point using the velocity error low band signal in place of the track crossing signal for this period of time.

Even if the pulse width of the track crossing signal is temporarily fluctuated due to the influence by the scratches formed on the recording surface of the recording disc, noises, or the like, therefore, the relatively stable velocity control of the information reading point is performed.

What is claimed is:

1. A feed velocity control apparatus for a velocity control of an information reading point of a disc player which comprises an information reading device for reading recording information from recording tracks formed on a recording disc, thereby obtaining a read signal, and a moving device for moving the information reading point of said information reading means in the direction which traverses said recording tracks, said apparatus comprising:

tracking error generating means for generating a tracking error signal based on said read signal;

velocity signal generating means for generating a velocity signal corresponding to a transporting velocity of said transporting means based on said tracking error signal;

velocity error signal generating means for generating a velocity error signal corresponding to a difference between said velocity signal and a predetermined velocity at the time of a track jumping operation of said information reading means;

a low pass filter for obtaining a velocity error low band signal by extracting a low band component of said velocity error signal; and constant velocity control means for driving said moving device in accordance with said velocity error signal when said velocity signal lies within a predetermined velocity range at the time of the track jumping operation of said information reading means and driving said moving device in accordance with said velocity error low band signal in place of said velocity error signal when said velocity signal is out of said predetermined velocity range.

2. An apparatus according to claim 1, wherein said velocity signal generating means generates a binary track crossing signal on the basis of whether a signal level of said tracking error signal is larger than a predetermined threshold value or not, and sets said track crossing signal to said velocity signal.

3. An apparatus according to claim 1, wherein said constant velocity control means comprises:

pulse width measuring means for measuring a pulse width of said track crossing signal as a pulse width signal corresponding to said velocity signal;

velocity error generating means for obtaining a difference between said pulse width signal and a predetermined pulse width as said velocity error signal;

pulse width abnormality detecting means for detecting whether said pulse width lies within a range of a predetermined pulse width or not and generating an abnormality detection signal showing the absence of abnormality when it lies within said range and showing the presence of abnormality when it is out of said range; and means for driving said transporting means in accordance with said velocity error signal when said abnormality detection signal indicates the absence of abnormality and driving said moving device in accordance with said velocity error low band signal in place of said velocity error signal when said abnormality detection signal indicates the presence of abnormality.

4. An apparatus according to claim 2, wherein said constant velocity control means comprises:

pulse width measuring means for measuring a pulse width of said track crossing signal as a pulse width signal corresponding to said velocity signal;

velocity error generating means for obtaining a difference between said pulse width signal and a predetermined pulse width as said velocity error signal;

pulse width abnormality detecting means for detecting whether said pulse width lies within a range of a predetermined pulse width or not and generating an abnormality detection signal showing the absence of abnormality when it lies within said range and showing the presence of abnormality when it is out of said range; and means for driving said transporting means in accordance with said velocity error signal when said abnormality detection signal indicates the absence of abnormality and driving said moving device in accordance with said velocity error low band signal in place of said velocity error signal when said abnormality detection signal indicates the presence of abnormality.

5. An apparatus according to claim 1, further comprising acceleration component generating means for generating an acceleration signal whose level decreases so as to decelerate said velocity signal when said velocity signal is accelerating and whose level increases so as to accelerate said velocity signal when said velocity signal is decelerating, wherein said acceleration signal is added to said velocity signal.

6. An apparatus according to claim 3, further comprising acceleration component generating means for generating an acceleration signal whose level decreases so as to decelerate said velocity signal when said velocity signal is accelerating and whose level increases so as to accelerate said velocity signal when said velocity signal is decelerating, wherein said acceleration signal is added to said velocity signal.

7. An apparatus according to claim 4, further comprising acceleration component generating means for generating an acceleration signal whose level decreases so as to decelerate said velocity signal when said velocity signal is accelerating and whose level increases so as to accelerate said velocity signal when said velocity signal is decelerating, wherein said acceleration signal is added to said velocity signal.

8. An apparatus according to claim 3, wherein when said velocity signal is out of said predetermined velocity range, said velocity error generating means and said acceleration component generating means are put in a reset state, respectively, and after that, when said velocity signal continuously lies within said predetermined velocity range twice, said reset state is cancelled.

9. An apparatus according to claim 4, wherein when said velocity signal is out of said predetermined velocity range, said velocity error generating means and said acceleration component generating means are put in a reset state, respectively, and after that, when said velocity signal continuously lies within said predetermined velocity range twice, said reset state is cancelled.

10. An apparatus according to claim 5, wherein when said velocity signal is out of said predetermined velocity range, said velocity error generating means and said acceleration component generating means are put in a reset state, respectively, and after that, when said velocity signal continuously lies within said predetermined velocity range twice, said reset state is cancelled.

11. An apparatus according to claim 6, wherein when said velocity signal is out of said predetermined velocity range, said velocity error generating means and said acceleration component generating means are put in a reset state, respectively, and after that, when said velocity signal continuously lies within said predetermined velocity range twice, said reset state is cancelled.

12. An apparatus according to claim 7, wherein when said velocity signal is out of said predetermined velocity range, said velocity error generating means and said acceleration component generating means are put in a reset state, respectively, and after that, when said velocity signal continuously lies within said predetermined velocity range twice, said reset state is cancelled.

* * * * *